United States Patent [19]

Rodrigue

[11] 4,252,363
[45] Feb. 24, 1981

[54] FOLDAWAY CANOPY FOR FLATBED TRUCK

[76] Inventor: Wilbrod Rodrigue, 85 Barton St., East, Hamilton, Ontario, Canada, L8L 2N1

[21] Appl. No.: 29,447

[22] Filed: Apr. 12, 1979

[51] Int. Cl.³ .............................................. B60J 7/06
[52] U.S. Cl. .................................. 296/100; 296/224; 292/254; 160/84 R
[58] Field of Search ............ 296/137 BC, 137 R, 100, 296/98, 137 E, 137 G, 222, 224; 160/84 R; 292/254

[56] References Cited

U.S. PATENT DOCUMENTS

| | | | |
|---|---|---|---|
| 2,769,658 | 11/1956 | Edmonds, Sr. | 296/100 |
| 3,169,792 | 2/1965 | Viquez | 296/99 |
| 3,298,732 | 1/1967 | Openshaw | 296/100 |
| 3,419,304 | 12/1968 | Sangimino | 296/99 |
| 3,649,072 | 3/1972 | Cross | 296/137 B |
| 3,910,629 | 10/1975 | Woodard | 296/137 B |
| 3,986,749 | 10/1976 | Hull et al. | 296/137 B |
| 4,068,886 | 1/1978 | Gostomski | 296/137 B |

FOREIGN PATENT DOCUMENTS

| | | | |
|---|---|---|---|
| 233413 | 5/1964 | Austria | 296/137 B |
| 455076 | 3/1949 | Canada . | |
| 475787 | 4/1954 | Canada . | |
| 844465 | 6/1970 | Canada . | |
| 902677 | 6/1972 | Canada . | |
| 939419 | 1/1974 | Canada . | |
| 1048406 | 11/1966 | United Kingdom | 296/137 B |

Primary Examiner—John J. Love
Assistant Examiner—Norman L. Stack

[57] ABSTRACT

A canopy to cover the open box or flatbed of a pickup truck and selectively retractable to uncover the flatbed and conventionally use the truck. This foldaway canopy is characterized by a pair of rigid end portions which cooperatively form an enclosing case for an intermediate section of foldable material, by a simple guide track system, and by the end portions and intermediate section outwardly overhanging a pair of guide tracks to conceal the latter against snow and ice. The rear rigid end portion is mounted on carriages engaging the guide tracks and the foldable material is supported by transverse arches having their opposite ends, each slidable on a cable mounted in the corresponding guide track. Hooks and detents are provided to lock the rear end portion in open or closed position.

5 Claims, 11 Drawing Figures

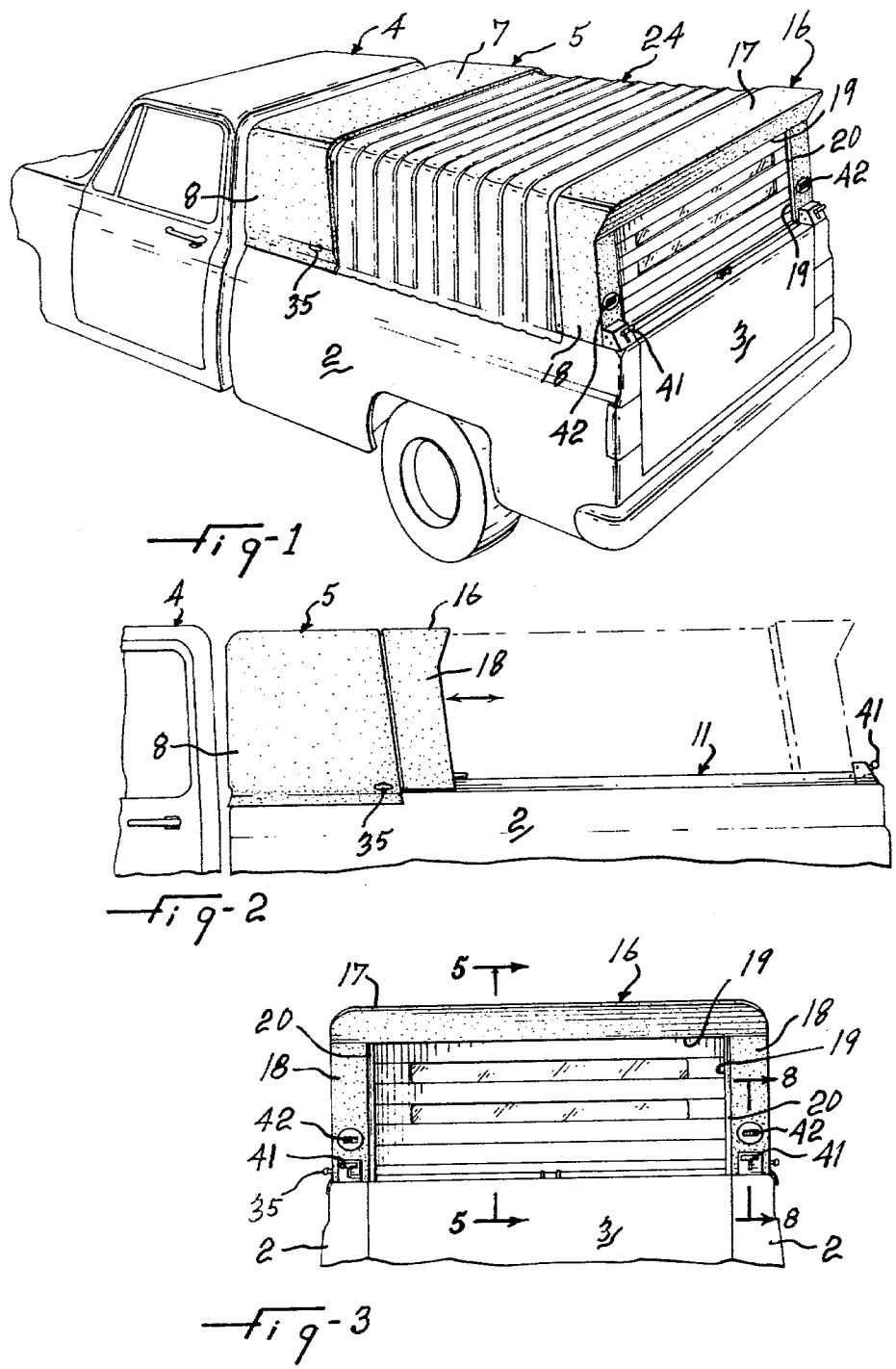

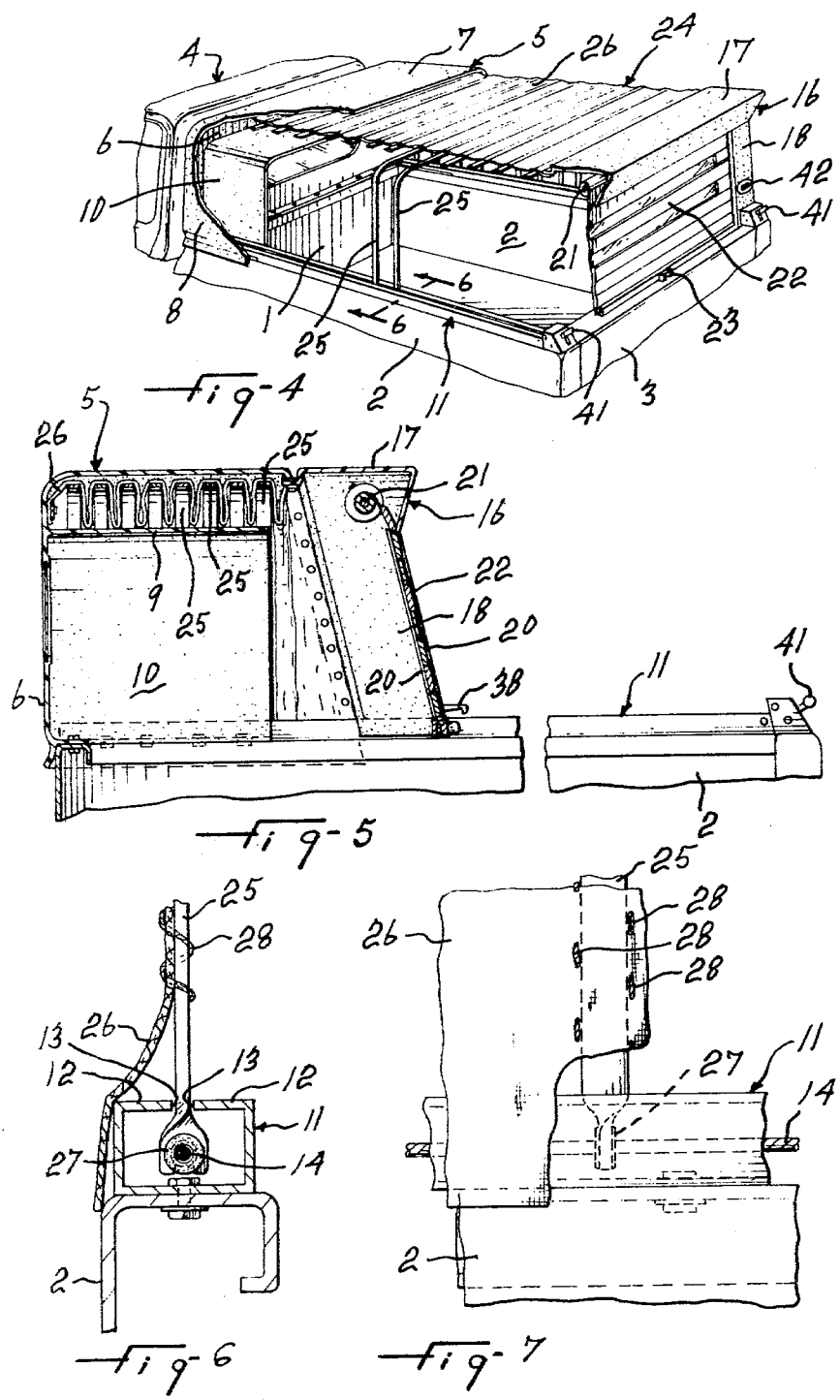

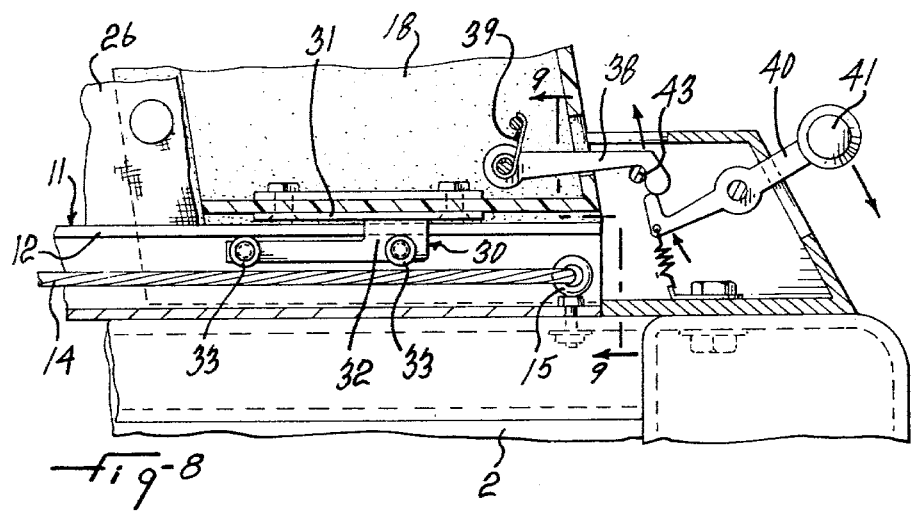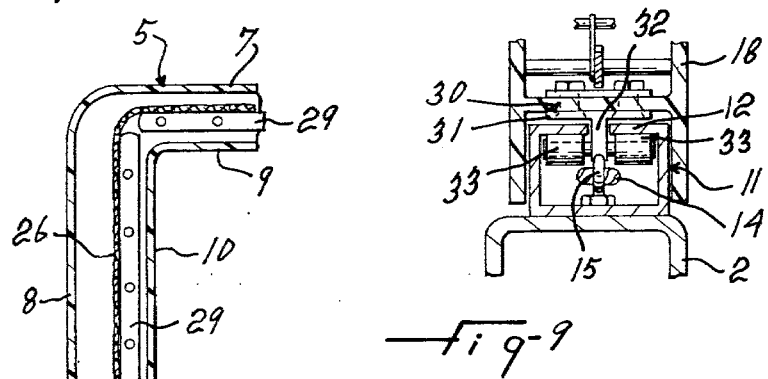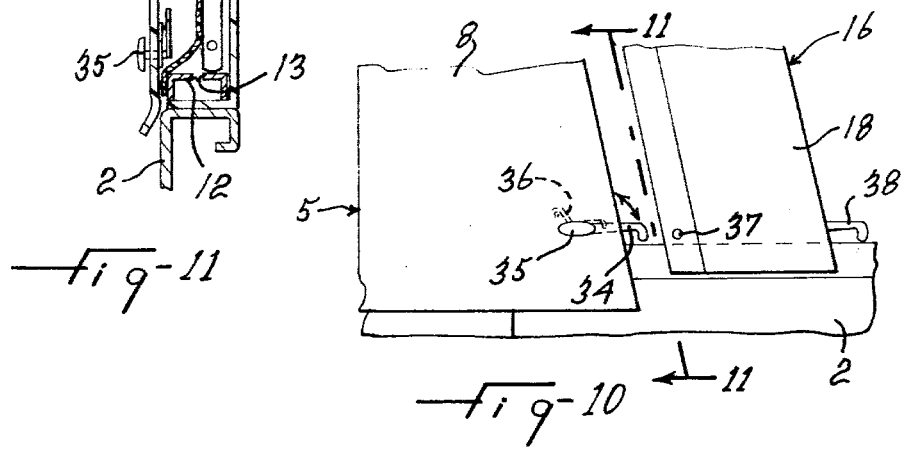

FOLDAWAY CANOPY FOR FLATBED TRUCK

This invention reates to a cover or canopy of the type that goes over the flatbed of a truck, such as a pickup truck, and is collapsible or retractable to selectively uncover the flatbed. More particularly, this invention relates to a foldaway canopy of the above-mentioned type.

The covers, or canopies of the above type which have been proposed so far are not, when in retracted position, well protected against adverse weather and environmental conditions, such as rain, snow, ice, dust and dirt. When they are made of strictly rigid members or components, they add substantial weight and complexity and when embodying foldable material, they are not adapted to be readily folded to uncover the flatbed for conventional use of the truck.

It is a general object of the present invention to provide a foldaway canopy of the above type, which is of simple and relatively light weight construction.

It is a more specific object of the present invention to provide a foldaway canopy of the above type wherein a simple guide track system is provided to produce the folding operation.

It is another specific object of the present invention to provide a foldaway canopy of the above type wherein the opposite ends of the canopy cooperatively form an all enclosing case for folding therein of an intermediate section of foldable material upon retraction of the canopy.

The above and other objects and advantages of the present invention will be better understood with reference to the following detailed description of a preferred embodiment thereof which is illustrated, by way of example, in the accompanying drawings, in which:

FIG. 1 is a perspective view of the rear of a flatbed truck with a foldaway canopy mounted thereon according to the present invention and shown in extended position;

FIG. 2 is a side elevation view of the foldaway canopy of FIG. 1 shown in retracted position;

FIG. 3 is a rear view of the foldaway canopy;

FIG. 4 is a perspective view of the same foldaway canopy with parts broken away;

FIG. 5 is a cross-sectional view as seen along line 5—5 in FIG. 3;

FIG. 6 is a cross-sectional view as seen along line 6—6 in FIG. 4;

FIG. 7 is a side elevation view as seen from the right in FIG. 6;

FIG. 8 is a cross-sectional view as seen along line 8—8 in FIG. 3;

FIG. 9 is a cross-sectional view as seen along line 9—9 in FIG. 8;

FIG. 10 is a detailed side elevation view of a portion of the foldaway canopy; and FIG. 11 is a cross-sectional view as seen along line 11—11 in FIG. 10.

The illustrated foldaway canopy is adapted to be mounted on the front side 1, lateral sides 2 and tail gate 3 of a pickup truck 4 which defines a flatbed surrounded by the sides 1, 2, 2, and 3.

The foldaway canopy includes a front rigid end portion 5 comprising a shell made of a front wall 6, a top wall 7 and opposite lateral side walls 8. The lower edge of the walls 6 and 8 are fixedly secured against the outside of the top edge of the walls 2, 2, and 1, defining the box of the pickup truck. The afore-mentioned shell is preferably integrally molded of any appropriate material, such as plastic or a fiber reinforced composite. The front rigid end portion 5 also includes an inner wall defining a top wall portion 9 and opposite lateral walls 10, 10 inwardly spaced from the walls 7, 8, and 8, respectively, and cooperatively forming therewith an inverted U-shape space between them. The walls 9, 10, 10 extend, co-extensively with the walls 7, 8, 8 of the shell, and are integrally formed with the latter. Thus, the inverted U-shape space is so shaped transversely of the truck and defines a rearwardly opening end of such inverted U shape.

A guide track system is operatively mounted on the top of the opposite lateral sides 2, 2 of the truck. This guide track system comprises a pair of guide tracks 11 secured longitudinally on the sides 2,2 and each having a C-shape cross-section, as best seen in FIGS. 6, 9, and 11. Each guide track 11 includes a pair opposite lateral edges 12 which are laterally spaced apart by a longitudinal slot 13. The guide track system also includes a steel cable 14 in each C-shape guide track 11. Each cable 14 is attached at its opposite ends to eyebolts 15 and held taut under the corresponding longitudinal slot or space 13 and longitudinally thereof.

The foldaway canopy also includes a rear rigid end portion 16, of inverted U-shape configuration, defining a top wall 17 and opposite sides 18. The latter defines a rear window opening 19 with slide tracks 20 along the laterally opposite sides thereof. A roller 21 extends lengthwise transversely of the truck and is rotatively mounted above the opening 19 at the top of the rigid end portion 16. A shutter 22, of the slat type, is attached at its upper end to the roller 21 and has its opposite lateral edges slidable in the slide tracks 20. Thus, the shutter 22 may be opened or closed by corresponding manual sliding thereof along the slideways or slide tracks 20 and forms a closure for rear window opening 19. A latch system is provided to hold the shutter in one of a plurality of predetermined positions ranging from a fully closed position to a fully opened position. This latch system includes a pair of hand-actuated projections 23 which are secured to push rods, not shown, which are spring biased horizontally away from each other toward latching engagement in catching apertures on the opposite sides of the window. Such construction is well known and need not be defined further, since it does not form a feature of the present invention.

The foldaway canopy also includes an intermediate foldable section 24 comprising a plurality of supporting arches 25 and a covering sheet of foldable material 26. The arches 25 have each their opposite ends engaged in the longitudinally slots 13 respectively and slidably engaged on the cables 14. For that purpose, each end of each arch 25 is engaged on a grommet 27 which slides on the corresponding cable 14. As shown in FIGS. 6 and 7, the foldable material 26 is laced by a cord 28 to the arches 25, such that the latter will be moved apart one from another upon extension of the foldable material in the longitudinal direction of the guide tracks 11. As shown in FIG. 11, the foldable material 26 is secured at its forward end by metal strips or blades 29 in the closed forward end of the inverted U-shape space defined by the front end portion or shell 5. The rear edge of the foldable material is secured against the inside face of the rear end portion 16 and along the forward edge thereof, as shown in FIGS. 5 and 8. The lower edge of the foldable material 26 and of the opposite lateral sides of the end portions 5 and 16 outwardly overhang the side tracks 11, as shown in FIGS. 5, 6, 7, 10, and 11 to conceal the same against snow and ice. As shown in FIG. 5, when the end portions 5 and 16 abut each other in closed position, the arches 25 and foldable material 26 are wholly enclosed within the enclosing space or case, so formed by the end portions. The foldable material is thus protected against adverse weather and environmental conditions.

The rear end portion or shell 16 is mounted on a pair of carriages, as shown in FIGS. 8 and 9, to provide displacement thereof along the guide tracks 11. Each carriage is secured in a concealed cavity upwardly extending in the bottom of a corresponding side 18. Each carriage comprises a T-shape bracket, or frame member 30, having a horizontal plate portion 31 to fixedly secure it to the bottom of the corresponding side 18, and a depending web 32 which downwardly extends through the slot 13 and rotatably carries rollers 33. The latter rollably engage the underside of the opposite lateral edges 12.

The rear end portion 16 is latched in forward position against the front end portion 5 by a hook 34 pivotally mounted on a side wall 8 and connected to a handle 35 to be pivoted by the latter. A spring 36 biases the hook 34 towsrd latching engagement with a pin 37 laterally projecting outwardly from the corresponding side 18 of the rear end portion 16. Preferably, there is such latch arrangement on each side of the fixed and movable end portions 5 and 16, respectively.

The rear end portion 6 is latched in fully rearward or canopyforming position by a pair of hooks 38 rearwardly projecting from the bottom of the sides 18 respectively. As best shown in FIG. 8, each such latch includes a spring 39 to bias the hook 38 toward the latching position. An unlatching lever 40 is pivotally mounted to unlatch the hook 38 upon downward pivoting through the outward handle portion 41 thereof.

The rear of each side 18 of the rear end portion is formed with a hand grip cavity 42 to facilitate rearwardly pulling of that movable portion to get engagement of the hooks 38 with the latch pin 43.

What I claim is:

1. A foldaway canopy to cover the open bed of a truck, said open bed defining a front end and a rear end, and said foldaway canopy comprising rigid front and rear shells, each of inverted U-shape, upstanding from, and extending transversely of, said bed and each defining a top wall and side walls, said front shell fixed to the front end of said bed, having a front wall and fully open at its rear end, said rear shell fully open at both ends and having an openable closure at its rear end, a pair of guide tracks extending endwise longitudinally of said bed at each side thereof from a front point close to said front wall of said front shell along the lower edges and inwardly of the respective side walls of said front shell and extending rearwardly from said front shell and terminating at a point close to the rear end of said flatbed, carriages carried by the lower portion of the side walls of said rear shell and located inside said rear shell and movably engaging said guide tracks for longitudinal guided movement of said rear shell between a rear position at the rear end of said bed, and a front position in which its front end abuts against the rear open end of said front shell and forms therewith a protective case against the weather when said closure is closed, a foldable canopy section extending between said front and rear shells and including a flexible sheet material and supporting arches secured to said sheet material at spaced zones longitudinally of said bed, said sheet material and said arches having an inverted U-shape transversely of said bed, the lower ends of said arches engaging said guide tracks and displaceable along the same, the front end of said sheet material secured to said front shell inside the same and at said front wall, the rear end of said sheet material secured to said rear shell inside the same, said arches and sheet material completely located within said case in the front position of said rear shell, first manually-operated interengageable latching means carried by said front and rear shells to latch the same in abutting and protective case-forming position and second manually-operated inter-engageable latching means carried by said rear shell and the rear end of said bed to latch said rear shell in rear position with said sheet material and arches extending between said two shells.

2. A foldaway canopy as defined in claim 1, wherein said guide tracks are each of generally C-shape cross-section including a pair of opposite longitudinal edges spaced apart by a longitudinal slot and all extending lengthwise at the top of the guide tracks, ssid carriages extending through said slots, the lower ends of said arches extending also through said slots and carrying grommets at their lower ends within said guide tracks, and further including in each guide track a guide cable extending longitudinally thereof and through the grommets of all the arches, said grommets slidable along said cable.

3. A foldaway canopy as defined in claim 1 or 2, wherein said first latching means include a pair of spingbiased hooks operatively mounted on the opposite sides, respectively, of one of said shells in operative hooking position relative to corresponding catch members, respectively, mounted on the other of said shells, and a handle is connected to each of said spring-biased hooks to selectively release the latter from engagement with said catch members, respectively.

4. A foldaway canopy as defined in claim 1 or 2, wherein said second latching means include a pair of springbiased hooks positively mounted on the opposite sides respectively, of said rear shell in operative hooking position relative to corresponding catch members, respectively fixedly secured relative to the rear ends of said guide tracks and an unlatching handle is connected to each of said spring-biased hooks to selectively release the latter from engagement with said catch members, respectively.

5. A foldaway canopy as defined in claim 1 or 2, wherein the side walls of said front shell, of said rear shell and of said foldable sheet material hang over and conceal the outside of said guide tracks.

* * * * *